United States Patent [19]

Johnson

[11] Patent Number: 5,015,053
[45] Date of Patent: May 14, 1991

[54] REDUCTION OF MODULATOR NON-LINEARITIES WITH INDEPENDENT BIAS ANGLE CONTROL

[75] Inventor: Leonard M. Johnson, Carlisle, Mass.

[73] Assignee: Massachusetts Institute of Technology, Cambridge, Mass.

[21] Appl. No.: 404,755

[22] Filed: Sep. 8, 1989

Related U.S. Application Data

[63] Continuation-in-part of Ser. No. 343,039, Apr. 25, 1989.

[51] Int. Cl.$^5$ .............................. G02B 6/10; G02F 1/01
[52] U.S. Cl. ............................... 350/96.14; 350/96.12; 350/96.13
[58] Field of Search ............... 350/96.11, 96.12, 96.13, 350/96.14

[56] References Cited

U.S. PATENT DOCUMENTS

| | | | |
|---|---|---|---|
| 4,012,113 | 3/1977 | Kogelnik et al. | 350/96 |
| 4,127,320 | 11/1978 | Li | 350/96.13 |
| 4,291,939 | 9/1981 | Giallorenzi et al. | 350/96.14 |
| 4,340,272 | 7/1982 | Papuchon et al. | 350/96.14 |
| 4,691,984 | 9/1987 | Thaniyavarn | 350/96.14 |
| 4,711,515 | 12/1987 | Alferness | 350/96.14 |
| 4,752,120 | 6/1988 | Shimizu | 350/388 |
| 4,769,853 | 9/1988 | Goodwin et al. | 455/616 |
| 4,798,434 | 1/1989 | Dammann et al. | 350/96.11 |
| 4,820,009 | 4/1989 | Thaniyavarn | 350/96.13 |

OTHER PUBLICATIONS

Kolner et al, "Intermodulation Distortion and Compression in an Integrated Electrooptic Modulator" Applied Optics (25) p. 3673.
Johnson et al, "Reduction of Intermodulation Distortion in Interferometric Optical Modulators" Optical Soc. Am. v13(10) p. 928.
Betts et al, "High Performance Optical Analog Link Using External Modulator" IEEE Photonics Tech. Letters v(1)11 p. 404.
B. H. Kolner and D. W. Dolfi, "Intermodulation Distortion and Compression in an Integrated Electrooptic Modulator", Applied Optics, 25, 3676-3680 (1987).
"External Amplitude Modulation Offers New Hope for RF Transmission", Lightwave, p. 6 (Feb. 1989).
P. R. Ashley and W. S. C. Chang, Digest of Topical Meeting on Integrated and Guided-Wave Optics, p. 36, (Optical Society of America, 1986).

Primary Examiner—John D. Lee
Assistant Examiner—Stephen W. Barns
Attorney, Agent, or Firm—Hamilton, Brook, Smith & Reynolds

[57] ABSTRACT

An electro-optical modulating system has a light source for producing a carrier wave. The carrier wave is polarized by a polarizer so as to adjust the power of the carrier wave in transverse electric (TE) polarization mode and in transverse magnetic (TM) polarization mode. In addition to a polarizer the electro optical modulating includes at least one set of electrodes for adjusting phase biases of the TE and TM polarization mode components of the carrier wave. The electrodes allow independent control of the phase biases of the respective TE polarization mode components and TM polarization mode components. Multiple sets of electrodes for adjusting the phase biases may be used. A modulating means is also included for modulating the carrier wave so as to encode information. The modulating system preferably also includes an interferometric modulator comprised of at least two branches. The modulation and phase bias adjustment take place on both of the respect branches.

43 Claims, 8 Drawing Sheets

REDUCTION OF MODULATOR NON-LINEARITIES WITH INDEPENDENT BIAS ANGLE CONTROL

GOVERNMENT SUPPORT

The research under which this invention was made was sponsored by the United States Air Force, Contract No. F19628-85-C-0002. As such, the United States Government has certain rights regarding this invention.

RELATED APPLICATIONS

This application is a continuation-in-part of U.S. Pat. application "Apparatus and Method for Reducing Modulator Nonlinearities", by Johnson, Ser. No. 07/343,039 filed on Apr. 25, 1989.

BACKGROUND OF THE INVENTION

The present invention relates to the field of optical-fiber communication links and more particularly to a method of reducing the intermodulation distortion found to occur in link systems. Analog optical-fiber communication systems are being actively developed as substitutes for conventional electromagnetic transmission lines. One system that has proven especially attractive is to employ a constant power optical source, such as a laser diode, in conjunction with an external modulator. Unfortunately, in this system, the dynamic range is limited by intermodulation distortion and harmonic distortion resulting from modulator nonlinearities. A need exists, therefore, for a method and apparatus that significantly reduces such modulator nonlinearities.

SUMMARY OF THE INVENTION

In accordance with one aspect of the present invention, a light source, such as a laser diode, produces a light carrier wave. The light passes through a polarizer or polarization-maintaining optical fiber and is coupled to an external modulator.

Ideally, for analog modulation, the optical transmission of the external modulator varies linearly with drive voltage. Most modulators, however, have a nonlinear response. These nonlinearities lead to intermodulation and harmonic distortion.

The optical output power $P_{out}(t)$ of an interferometric waveguide modulator varies sinusoidally, as follows:

$$P_{out}(t) = \frac{P_{in}}{2}[1 + \cos(\phi(t) + \theta)]$$

where $P_{in}$ is the input optical power, $\phi(t)$ is proportional to $V_{in}(t)$ (modulating voltage) and $\theta$ is the phase bias of the modulator. At the half-power point ($\theta = \pm \pi/2$), which corresponds to maximum modulator sensitivity, the time-varying optical power can be approximated as:

$$P_{out}(t) \sim \frac{P_{in}}{2} \phi(t) - \frac{P_{in}}{16} \phi(t)^3 + \text{higher order terms.}$$

The cubic term in this expression is the dominant nonlinear component leading to third-order intermodulation distortion. This term also leads to third-harmonic distortion. At the half-power point, the even-order terms which lead to even harmonics, vanish.

The proportionality factor between $\phi(t)$ and $V_{in}(t)$ differs by a factor of $\gamma$ between the TE and TM polarization modes of the modulator, such that:

$$\frac{\phi_{TE}}{V_{in}} = \gamma \frac{\phi_{TM}}{V_{in}}.$$

This difference in sensitivity is exploited in the present invention to selectively cancel the cubic drive voltage dependence of the modulator and therefore greatly reduce the third-order intermodulation and third-harmonic distortion. This is achieved by coupling light into both the TE and TM propagating modes of the modulator and by adjusting the relative TE and TM power levels by the polarizer, and by adjusting the phase biases of the modulator, such that:

$$\gamma^3 P_{in}^{TE} \sin \theta_{TE} = -P_{in}^{TM} \sin \theta_{TM}.$$

With the above expression satisfied and with $\theta_{TE} = \pi/2$ and $\theta_{TM} = -\theta/2$, both the even-power terms and the cubic term vanish. Preferably, $\theta_{TE}$ and $\theta_{TM}$ can be independently set to achieve these optimal phase biases. It is preferred that the phase biases be adjusted using sets of electrodes.

The electrodes used to adjust phase biases of interferometric modulators are configured so that they generate independently controlled electric fields transverse and perpendicular to the modulator substrate. The electric fields generated as such alter the indexes of refraction in branches of the modulator. The combination of perpendicular and transverse fields affect in differing degrees the phase bias angles of the two polarization modes. The altered indexes of refraction bring about the phase biases by providing a difference in speed between the carrier waves traveling through the branches of the modulator.

One or two sets of electrodes may be used to adjust the phase biases. If one set of electrodes is used, it preferably provides via a first applied voltage an electric field transverse to the surface of the substrate in one of the waveguide branches and an electric field via a second applied voltage perpendicular to the surface of the substrate in the other branch of the modulator. If, on the other hand, two sets of electrodes are used to adjust the phase biases of the polarization mode components, it is preferable that one set of electrodes generates an electric field transverse to the surface of the substrate and that the other set of electrodes generates an electric field perpendicular to the surface of the substrate.

The modulator is preferably comprised of lithium niobate ($LiNbO_3$) or another type of electro-optic cyrstal such as lithium tantalate ($LiTaO_3$).

Thus, the modulating system of the present invention produces an output signal that is modulated but with minimal cubic intermodulation distortion.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
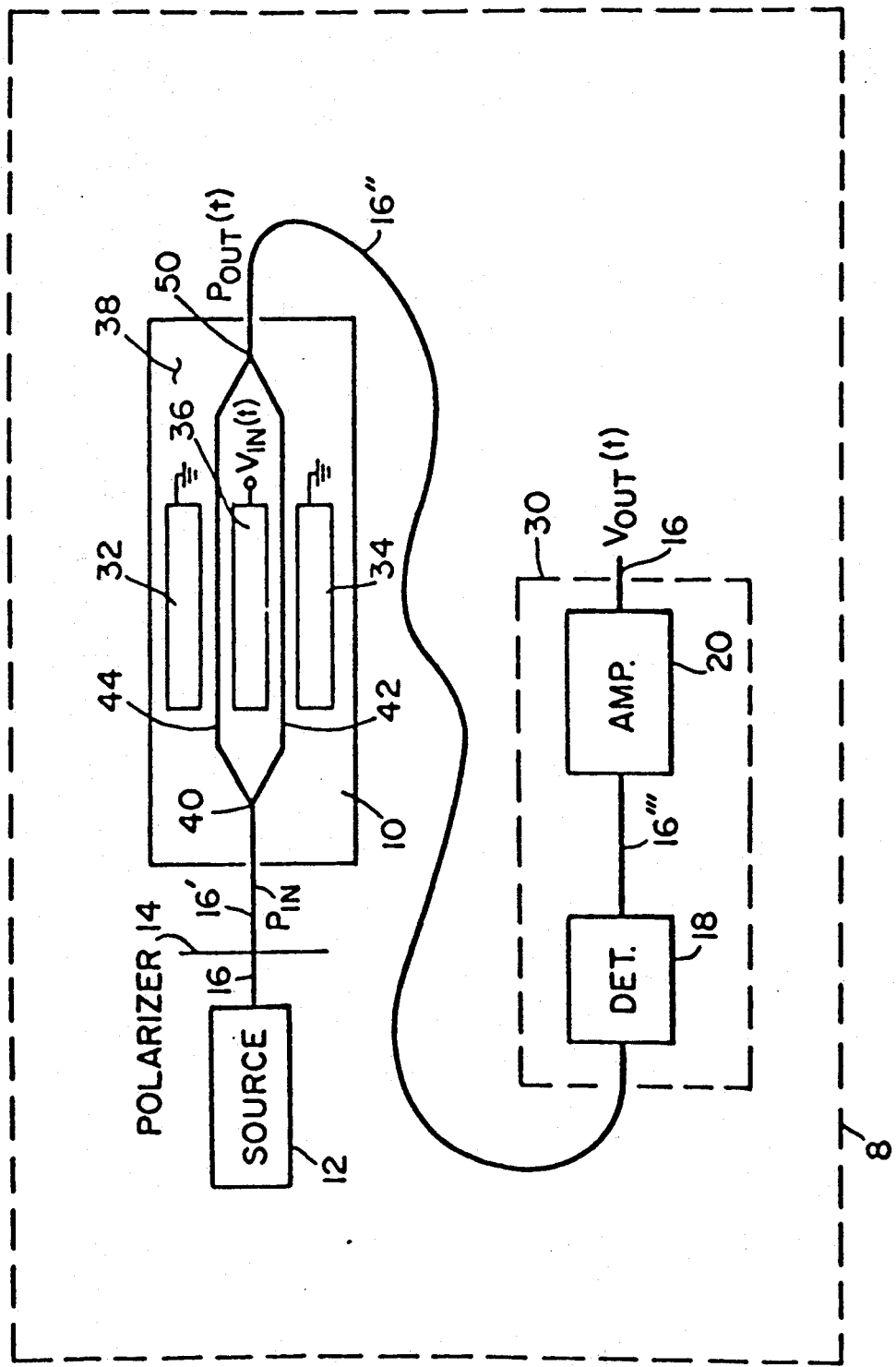
FIG. 1 is a block diagram of an optical system for reducing intermodulation distortion in accordance with the present invention.

A preferred embodiment of the electro-optical communication system of the invention will now be described in connection with FIG. 1. The system comprises, in general, a continuous wave light source 12 for generating an optical carrier wave which is modulated to encode the light wave with information in modulator 10 in accordance with an electrical input modulator voltage signal $V_{in}(t)$. The output of modulator 10 is an intensity modulated optical carrier signal in which analog information is encoded in the intensity modulations. Once modulated, the output signal can be transmitted over an optical fiber transmission line to a receiver 30 located at a remote location. Receiver 30, shown in superficial form, consists of a detector 18 for detecting or demodulating the intensity modulations of the optical signal and converting them to a corresponding electrical signal which is optionally amplified in an amplifier 20. The modulator 10 is preferably a Mach-Zehnder interferometer, however, other similar modulators, such as directional couplers, may be employed and are intended to be encompassed within the present invention.

In the preferred embodiment, a laser light source 12, such as a laser diode, is used to produce a linearly polarized carrier light signal. The light produced by this light source 12 is coupled by optical fiber 16 to a polarizer 14. Polarizer 14 adjusts the relative power in the TE and TM polarization modes of modulator 10. An optical fiber 16' connects polarizer 14 to the modulator 10.

The modulator 10 preferably comprises an interferometric waveguide modulator consisting of Ti-diffused waveguides 44 and 42 with strips of adjacent metal electrodes 32, 34 and 36 formed on a Lithium Niobate (LiNbO₃) substrate 38. Waveguides 44 and 42 are connected by branch 40 at the input and branch 50 at the output. The input optical carrier signal $P_{in}$ is divided at branch 40 into two equal carrier signals, one of which travels along waveguide 42 and the other of which travels along waveguide 44. A time varying voltage signal $V_{in}(t)$ applied across terminal 36 and grounded terminals 32 and 34 phase modulates the two carrier signals in the waveguides 42 and 44. The intensity modulation is achieved by changing the index of refraction of the LiNbO₃ substrate to slow down or speed up the optical carrier signal in accordance with the modulations in drive voltage $V_{in}(t)$.

The two TE and TM optical signals are combined at branch 50 and interfere, resulting in intensity modulation. They are then propagated from the modulator 10 via an optical fiber 16'' to a receiver 30 for detection, or for demodulation, of the modulation produced by voltage signal $V_{in}(t)$. The receiver 30 consists of a photodetector 18 which converts the modulations into an electrical signal and an amplifier 20 for amplifying the electrical signal.

Polarization adjustments to the relative optical input power and adjustments to the phase biases of the TE polarization mode and of the TM polarization mode of the modulator result in a cancellation within the modulator 10 of the dominant cubic term of the modulator response which results in reduction of third order intermodulation distortion. The recombined signal detected by the photodetector 18 is substantially free of the dominant cubic term of the intermodulation and harmonic distortion making the fundamental frequency more readily detectable.

The detected signal passes through a wire to a voltage amplifier 20. The amplifier 20 boosts the voltage of the signal to produce the amplified output signal $V_{out}(t)$.

Thus far, the discussion of the present invention has focused on the operative steps and elements embodied in the present invention. However, to fully appreciate the present invention, it is useful to consider the underlying theory that is utilized by the invention. The starting point for such a discussion is a characterization of the light source 12.

The power of the analog carrier light signal produced by the light source 12 at the input to the modulator 10 is, as already noted, denoted as $P_{in}$. After the carrier light signal is modulated by the modulator 10, the optical power of the light signal is denoted as $P_{out}(t)$.

The optical output power $P_{out}(t)$ of an interferometric modulator varies sinusoidally, as follows:

$$P_{out}(t) = \frac{P_{in}}{2}[1 + \cos(\phi(t) + \theta)]$$

where $P_{in}$ is the optical input power, $\phi(t)$ is linearly proportional to $V_{in}(t)$ (modulating voltage) and where $\theta$ is the phase bias of the modulator. At the half-power point ($\theta = \pm \pi/2$), which corresponds to maximum modulator sensitivity, the time-varying optical output power can be approximated as:

$$P_{out}(t) \sim \frac{P_{in}}{2}\phi(t) - \frac{P_{in}}{16}\phi(t)^3 + \text{higher order terms.}$$

The cubic term in this expression is the dominant component leading to third-order intermodulation distortion. This term also leads to third-harmonic distortion. At the half-power point, the even-order terms which lead to even harmonics, vanish.

In light of the proportionality of the time-varying phase modulation $\phi(t)$ to the drive voltage $V_{in}(t)$, the time-varying phase modulation $\phi(t)$ can, thus, be written as $\phi_m(\sin\omega_1 t + \sin\omega_2 t)$ where $V_m \sin\omega_1 t$ and $V_m \sin\omega_2 t$ are the two sinusoidal signals that constitute the modulating means drive voltage $V_{in}(t)$ in order to characterize intermodulation distortion.

These combined sinusoidal signals are applied to electrodes in the modulator 10.

Viewing $V_{in}(t)$ as comprised of two sinusoidal signals $P_{out}(t)$ can also be written in a different form. In particular, $$P_{out}(t) = P_{0,0} + P_{1,0}(\sin\omega_1 t + \sin\omega_2 t) +$$

$$\sum_{k=2}^{\infty} P_{k,0}(\sin(k\omega_1 t) + \sin k\omega_2 t) +$$

$$\sum_{k=1}^{\infty}\sum_{j=1}^{\infty} P_{k,j}(\sin(k\omega_1 + j\omega_2)t) +$$

$$\sum_{k=1}^{\infty}\sum_{j=1}^{\infty} P_{k,j}(\sin(k\omega_1 - j\omega_2)t)$$

where
$P_{0,0}$ = amplitude coefficient for dc components;
$P_{1,0}$ = amplitude coefficients for the fundamentals;
$P_{k,0}$ = amplitude coefficients for the harmonics;
$P_{k,j}$ = amplitude coefficients for sum-frequency or difference-frequency intermodulation components.

Unfortunately, when the output signal is modulated, intermodulation and harmonic distortion typically occurs because of the sinusoidal nature of the modulating means response. The contribution of distortion to the output signal is included in the above series equation. Specifically, the first summation term corresponds to harmonic distortion; the second summation term corresponds to sum-frequency intermodulation distortion; and the third summation term corresponds to difference frequency intermodulation distortion. The other two terms of the series [i.e., the D.C. term $P_{0,0}$ and the fundamental term $P_{1,0}(\sin\omega_1 t + \sin\omega_2 t)$] correspond to the DC average power and to the power at the fundamental frequencies of the two voltage drive signals.

The harmonic distortion and sum-frequency intermodulation distortion can be filtered out of the resulting output signal for systems that operate over less than an octave bandwidth. However, difference frequency intermodulation distortion has proven to be more problematic. If the frequencies of the two voltage drive signals are nearly equal, then the dominant difference frequency intermodulation components (i.e., $2\omega_1 - \omega_2$ and $2\omega_2 - \omega_1$) are very close to the voltage drive signals (see FIG. 2). As such, these third-order intermodulation components cannot be readily filtered out of the output. The present invention provides an alternative means to filtering that significantly reduces this difference-frequency intermodulation distortion.

Referring again to the series equation for output power $P_{out}(t)$, the amplitude coefficients for the fundamentals can be estimated as $(P_{in}/2)\phi_m\sin\theta +$ higher order terms, and the amplitude coefficients for the third-order intermodulation terms can be estimated as $(-P_{in}/16)(\phi_m)^3\sin\theta +$ higher order terms. The higher order terms do not contribute significantly to the respective components. The $\phi_m$ component in the third-order intermodulation terms is cubed because there is a cubic dependency between the modulating means output power at third-order intermodulation frequencies and the drive voltage. In contrast, there is only a linear dependency between the modulating means output power at the fundamental frequencies and the drive voltage. These estimates assume $\phi_m$ is significantly less than one.

The total output power at any of the frequencies is equal to the sum of the respective TE and TM components at that frequency. It is, therefore, appropriate to view the approximation of output power just described as being equal to the sum of an approximation for the TE components and an approximation for the TM components. The fact that the estimation can be viewed as the sum of the respective TE and TM components is important in selecting a modulator, for modulating means are capable of having different sensitivities to the different polarization components. In fact, a modulator can produce different sensitivities to the TE and TM modes using the same drive voltage amplitude. In particular, the modulator sensitivities can be adjusted so that for a given voltage amplitude $V_m$:

$$\phi_m^{TE} = \gamma \phi_m^{TM}$$

where
$\phi_m^{TE}$ = the amplitude of the time-varying phase modulation for the TE component;
$\phi_m^{TM}$ = the amplitude of the time-varying phase modulation for the TM component;
$\gamma$ = constant dictated by the modulating means.

Figure 2:
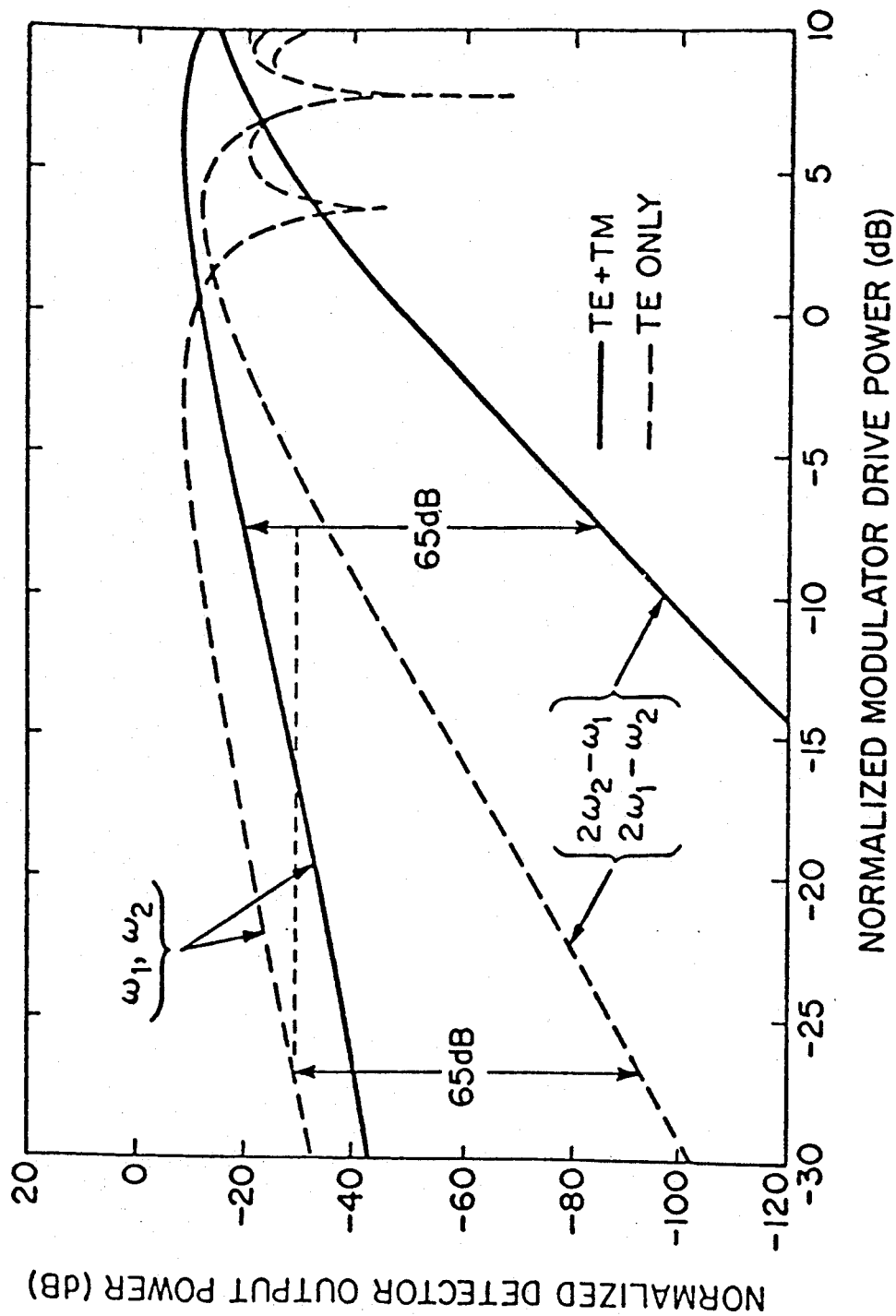
FIG. 2 is a graph of the modulator response at the fundamental frequencies and the response at the dominant third-order intermodulation distortion frequencies as found when the present invention is employed.

In the present invention, this difference in sensitivity is exploited to selectively cancel the dominant cubic term of the intermodulation distortion. As mentioned previously, the cancellation is accomplished by adjusting the optical input power of the different input polarization components (i.e., $P_{in}^{TE}$ and $P_{in}^{TM}$) through rotation of the polarizer 14 and by adjusting the electrical phase biases of the input polarization components (i.e. $\theta^{TE}$ and $\theta^{TM}$) within the modulating means 10. These parameters are adjusted such that:

$$P_{in}^{TE}(\phi_m^{TE})^3 \sin\theta_{TE} = -P_{in}^{TM}(\phi_m^{TM})^3 \sin\theta_{TM}$$

which results in cancellation of the cubic voltage dependence of the modulator and a reduction of the dominant third-order intermodulation distortion component (see FIG. 2).

Figure 3A:
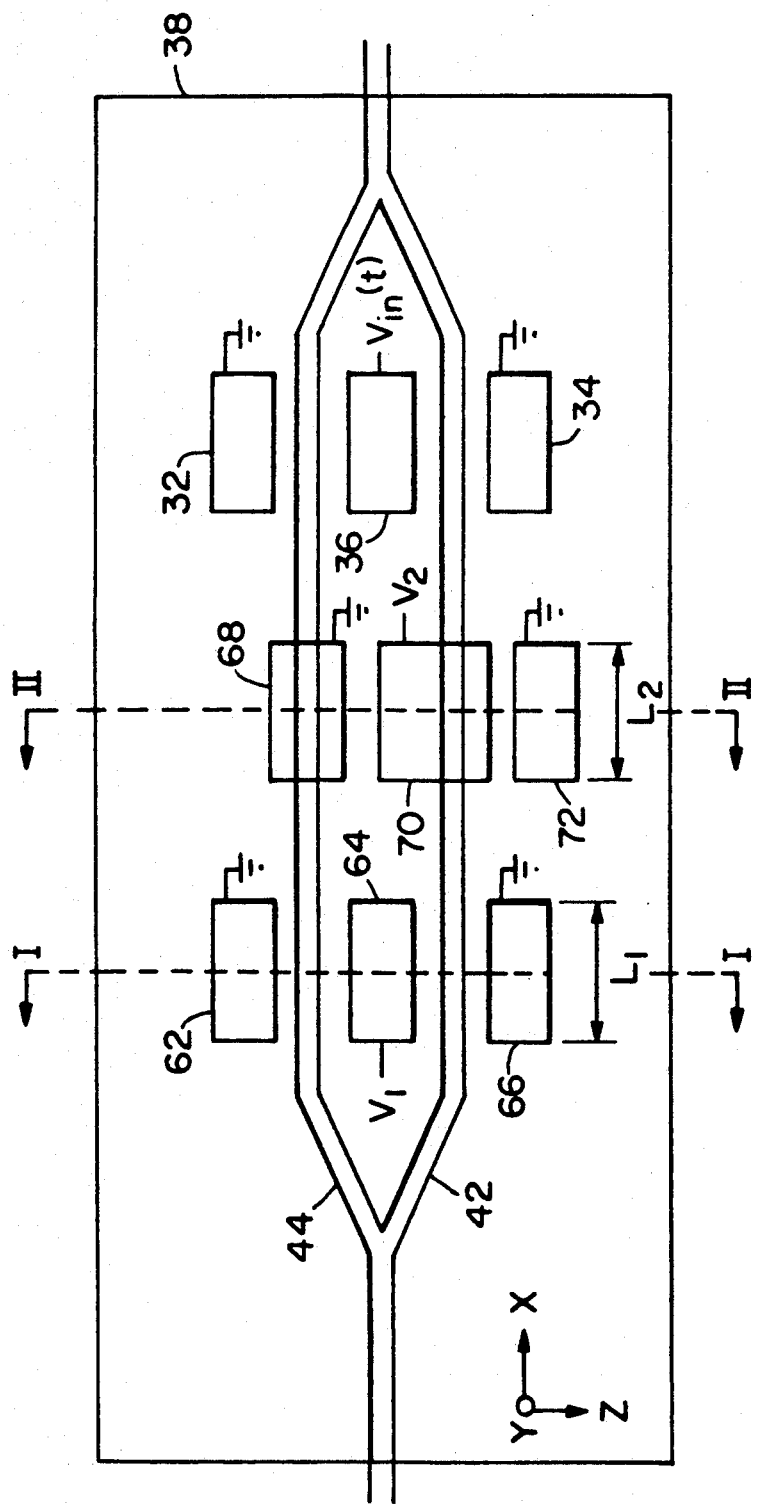
FIGS. 3a, 3b and 3c show a possible electrode configuration for modulator phase bias adjustment when using a Y-cut lithium niobate substrate.

In light of the above equation it is desirable to be able to independently adjust the modulator phase biases $\theta_{TE}$ and $\theta_{TM}$. To obtain such independent control of phase biases in the TE polarization and the TM polarization mode several different configurations may be employed. FIG. 3a shows one preferred embodiment in which sets of electrodes are utilized to independently adjust the phase biases in the two respective polarization modes. A separate set of electrodes are used to apply the modulating voltage $V_{in}(t)$. The arrangement of the electrodes is dependent upon the material from which the modulator is formed. In this case lithium niobate is the crystal on which the modulator is formed. In particular, FIG. 3a depicts a Y-cut lithium niobate substrate 38 in which the incoming light propagates in the X direction (see axes in FIG. 3a and note that the Y direction is towards the observer coming out of the paper).

The directions of orientation of the TE polarization mode and the TM polarization mode are by convention defined relative to the substrate of the waveguide through which the carrier wave passes. Specifically, TE polarization mode refers to the light polarized in the plane of surface of the substrate. In the Y-cut substrate shown in FIG. 3a the light having power in the TE polarization mode is polarized in the Z direction. The TM polarization mode, in contrast, refers to light that is polarized perpendicularly to the plane of the surface of the substrate. Thus, TM polarization mode is light that is polarized parallel to the Y axis.

It must be emphasized that the axes as shown in the example of FIG. 3a are for a Y-cut lithium niobate substrate. However, is should be noted that other materials may act as a substrate. For instance, any electro-optic crystal may potentially be useful in certain applications. Lithium niobate is chosen for the ease with which it is fabricated and its modulation efficiency. Other likely candidates include lithium tantalate and certain III-V semiconductors.

As was discussed above, light coming into the modulator 38 is comprised of energy in both the TE polarization mode and the TM polarization mode. After the optical power of the light is split into parallel waveguides, the light in the waveguide branches propagates between the electrodes 62, 64 and 66. More specifically, the light in the branch 44 of the waveguide travels between electrode 62 and 64, whereas the light in branch 42 of the waveguide travels between electrodes 64 and 66. As the light passes by the electrodes, a voltage applied to the electrodes imposes a phase bias on the light in the separate waveguides.

Figure 3B:
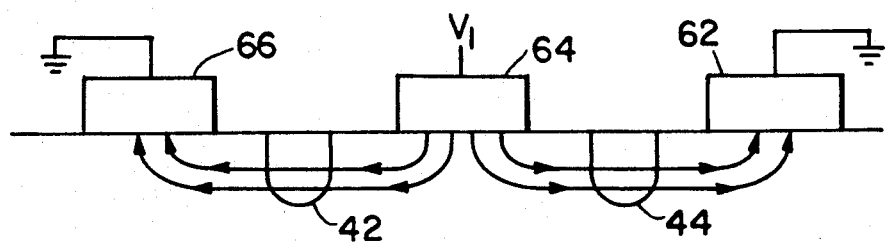

The phase biases imposed by electrodes 62, 64 and 66 is a result of the change in the index of refraction attributable to the electric field at the branches 42 and 44 taken along section I–I of FIG. 3a. The application of the voltage $V_1$ produces an electric field between electrodes 64 and 62 as well as between electrode 64 and electrode 66. These electric fields are present over the length of the electrodes (denoted as $L_1$ in FIG. 3a). FIG. 3b shows a cross sectional view of the electrodes 62, 64 and 66 and the branches 42 and 44. One of the electric field components generated by the application of the voltage $V_1$ travels from electrode 64 to electrode 66 across branch 42 in a transverse (Z) direction. The application of the voltage $V_1$ also generates an electric field that travels from electrode 64 to electrode 62 across branch 44 in a transverse (Z) direction but in the opposite direction of the same component in branch 42. Electrodes 62 and 66 are grounded.

As was mentioned previously, these electric fields affect the index of refraction of light propagating along branches 42 and 44. To discern the effect of the change in index of refraction, the electro-optic tensor for lithium niobate is referenced. The portion of the tensor that is of interest for present purposes is as follows:

MATRIX $$\begin{array}{c} & E_x & E_y & E_z \\ n_x & \begin{bmatrix} 0 & -r_{yy} & r_{yz} \\ n_y & 0 & r_{yy} & r_{yz} \\ n_z & 0 & 0 & r_{zz} \end{bmatrix} \end{array}$$

Where
 $E_x$ = electric field component in the X direction
 $E_y$ = electric field component in the Y direction
 $E_z$ = electric field component in the Z direction
 $n_x$ = index of refraction in the X direction
 $n_y$ = index of refraction in the Y direction
 $n_z$ = index of refraction in the Z direction
 r = electro-optic coefficients It should be noted that the tensor depicted is not complete but rather, only shows the first three rows of the tensor. The electro-optic tensor may be used to determine the effect of applying an electric field comprised of X, Y and Z components on the indexes of refraction in the X, Y and Z directions. The electro-optic coefficients express the relationship between the electric fields and the indexes of refraction.

As FIG. 3b shows, both of the electric fields travel in a transverse direction parallel to the Z axis. Thus, the electric field is comprised entirely of its $E_z$ component. Given that the electric field is comprised of entirely of an $E_z$ component, the phase bias $\theta_{TE}$ can be determined for this electric field. It is already known that the TE component is Z polarized, and thus, it is affected only by the index of refraction in the Z direction (i.e $n_z$). Referring to the electro-optic tensor, we consult the row for the index of refraction in the Z direction (i.e. $n_z$). We also know the electric field components that are present with the electrode configuration. In this case, the electric field is comprised only of a Z electric field component (i.e. $E_z$), and thus, the $E_z$ column is referenced. The electro-optical coefficient in row $n_z$ and column $E_z$ is $r_{zz}$. In light of this value, it can be established that $\theta_{TE}$ is proportional to $r_{zz}L_1V_1$. Moreover, it can be seen that $L_1$ and $V_1$ determine the extent of the phase bias for the TE polarization mode.

The electrodes 62, 64 and 66 also affect the TM polarization mode component of light in branches 42 and 44. As was mentioned previously, the TM polarization mode is parallel to the Y axes. Thus, a change in the index of refraction in the Y direction affects the TM polarization mode components. To determine the exact effects of the electric field, the electro-optic tensor is referenced by looking in the row $n_y$ (only the $E_z$ field is present at the first sets of electrodes 62, 64 and 66). The electo-optic coefficient $r_{yz}$ is located. As such $\theta_{TM}$ is proportional in part to $r_{yz}L_1V_1$.

Figure 3C:
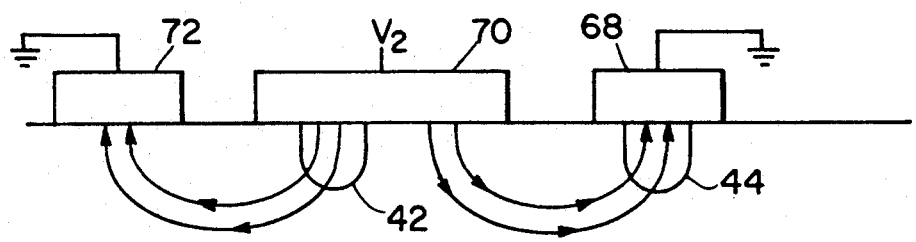

Refering back to FIG. 3a the function of the second set of electrodes 68, 70 and 72 will now be explained in detail. These electrodes affect the phase bias in the TM polarization mode but not in the TE polarization mode. FIG. 3c shows a cross-sectional view taken along section II—II. Specifically, it shows the electric fields generated when the voltage $V_2$ is applied to electrode 70 given that electrodes 68 and 72 are grounded. The resulting electric fields in branches 42 and 44 are along the Y axis but oppositely directed. By referring to the electro-optic tensor, we can establish the contribution to the phase bias in TM polarization mode by this set of electrodes 68, 70, and 72. In particular, the index of refraction $n_y$ is referenced since TM mode components are polarized in the Y direction. Given that there is an electrical field only in the Y direction, the column for $E_y$ is referenced. The resulting electro-optic coefficient is $r_{yy}$. In light of this electro-optic coefficient, $\theta_{TM}$ is established as being proportional to our $r_{yz}L_1V_1$ + $r_{yy}L_2V_2$ where $L_2$ is the length of the second set of electrodes 68, 70 and 72. The effect of the Y component of the electrical field ($E_y$) is negligible on the index of refraction in the Z direction ($n_z$). The final set of electrodes 32, 34, 36 are used to modulate the carrier wave as described previously.

Figure 4A:
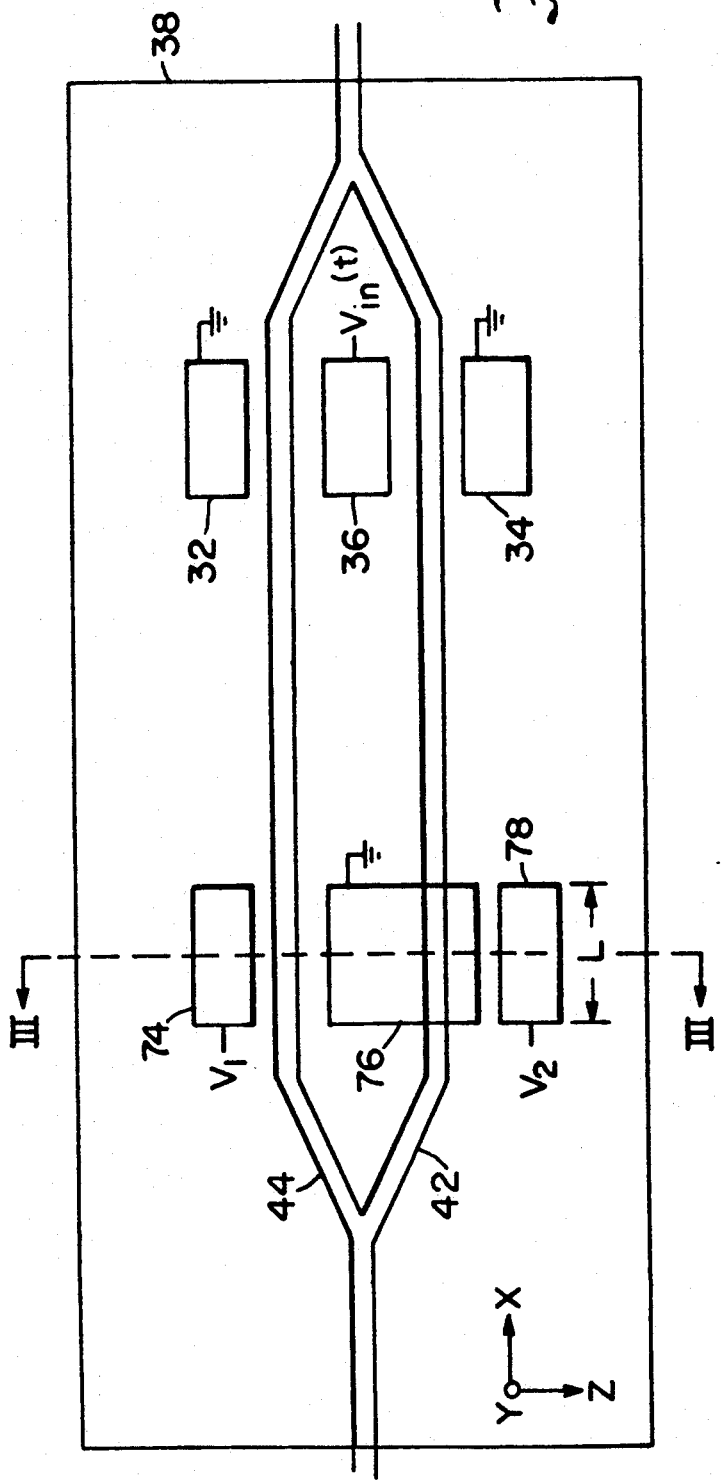
FIGS. 4a and 4b show an alternative electrode configuration for modulator phase bias adjustment when using a Y-cut lithium niobate substrate.
Figure 4B:
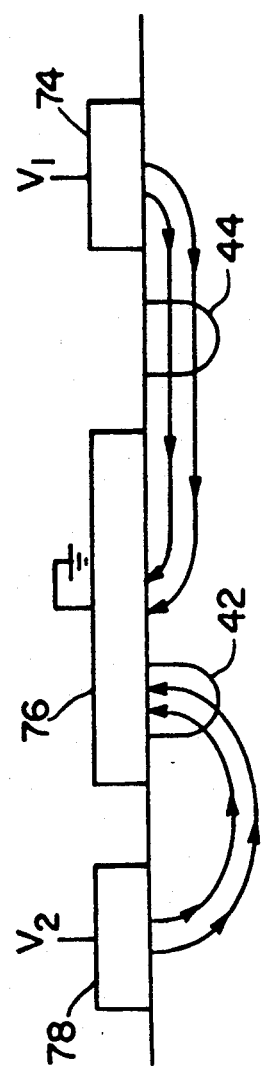

A different configuration for such a Y-cut lithium niobate substrate is shown in FIG. 4a. Instead of using two separate sets of electrodes to achieve independent phase bias control for the two polarization modes, a single set of electrodes 74, 76 and 78 is used. In this configuration the center electrode 76 is connected a ground and separate voltage sources $V_1$ and $V_2$ are connected to electrodes 74 and 78, respectively. When voltages $V_1$ and $V_2$ are applied to electrodes 74 and 78, respectively, the electric fields generated are as those shown in the cross sectional view along section III—III of FIG. 4b. The electric fields at branch 42 extend in a Y direction perpendicular to the substrate surface and are controlled primarily by $V_2$. In contrast, the electric field in branch 44 is directed in a Z direction, transverse to the plane of the substrate and are controlled primarily by $V_1$. The net result of such a configuration is similar to that produced by the first described configuration. In particular $\theta_{TE}$ is proportional to $r_{zz}LV_1$, and $\theta_{TM}$ is proportional to $r_{yz}LV_1+r_{yy}LV_2$. From these equations, it can be seen that $V_2$ is the sole determinate of the phase bias in the TM mode and $V_1$ is the sole determinate of the phase bias in the TE mode.

Figure 5B:
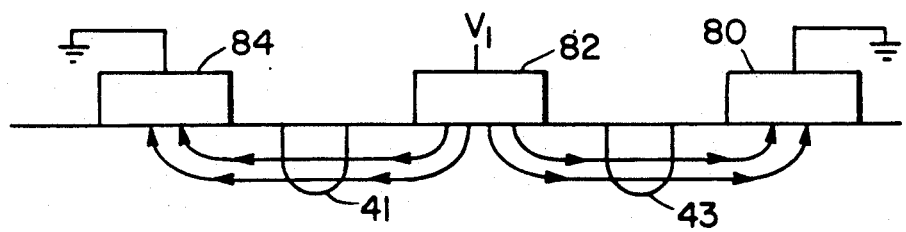
FIGS. 5a, 5b, 5c and 5d show a possible electrode configuration for modulator phase bias adjustment when using a Z-cut lithium niobate substrate.
Figure 5C:
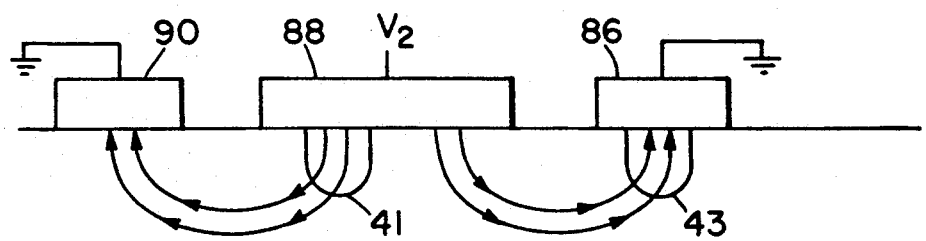

Independent phase bias control can also be obtained using a Z-cut lithium niobate substrate with waveguide propagation in the X direction. The TE polarization mode components are, accordingly, polarized in the Y direction and the TM polarization mode components are polarized in the Z direction. To obtain independent phase bias control with Z-cut lithium niobate, a push-pull configuration such as shown in FIG. 5a is used. When the Z-cut lithium niobate is used, note that the axes are oriented differently. The Z direction is perpendicular to the substrate, and the Y direction is parallel to the substrate. When voltage $V_1$ is applied to electrode 82 of the first set of electrodes, electric fields are generated like those shown in the cross-sectional view along section IV—IV of FIG. 5b (assuming that electrodes 84 and 80 are grounded). The electric fields are oriented in a transverse direction at branches 41 and 43 but in opposite directions for each of these two respective branches 41 and 43.

The effect of the electric fields on the phase biases of the polarization mode components can be specified by once again referencing the electro-optic tensor. The electric field in the Y direction affects the index of refraction $n_y$ but does not affect the index of refraction $n_z$. As such, the electric fields generated at the first set of electrodes 80, 82 and 84 affect only the phase bias of the TE polarization mode components. In particular, $\theta_{TE}$ is proportional in part to $r_{yy}L_1V_1$.

The second set of electrodes 86, 88 and 90 affect both the TE polarization mode components phase bias and the TM polarization mode components phase bias. The electric fields generated by the set of electrodes 86, 88 and 90 are shown in the cross-sectional view along sections V-V depicted in FIG. 5c. As can be seen in that figure, the electric fields at branches 41 and 43 are oriented perpendicular to the surface of the substrate and thus, are oriented in the Z direction. The field at each of the respective branches, however, is oriented in the opposite direction to the field at the other branch (i.e. one is oriented in the negative Z direction, and one is oriented in the positive Z direction). The electro-optic tensor for lithium niobate indicates that an electric field in the Z direction affects the index of refraction in the Y and the Z direction. This electric field, therefore, affects both the TE polarization mode phase bias and the TM polarization mode phase bias. Specifically, $\theta_{TM}$ is proportional to $r_{zz}L_2V_2$ where $L_2$ is the length of the second set of electrodes. Accounting for the previously discussed contribution to the phase bias in the TE mode of the first set of electrodes, $\theta_{TE}$ is proportional to $r_{yy}L_1V_1+r_{yz}L_2V_2$.

Figure 5D:
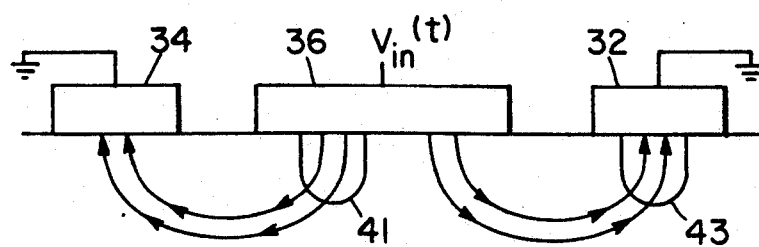
Figure 5A:
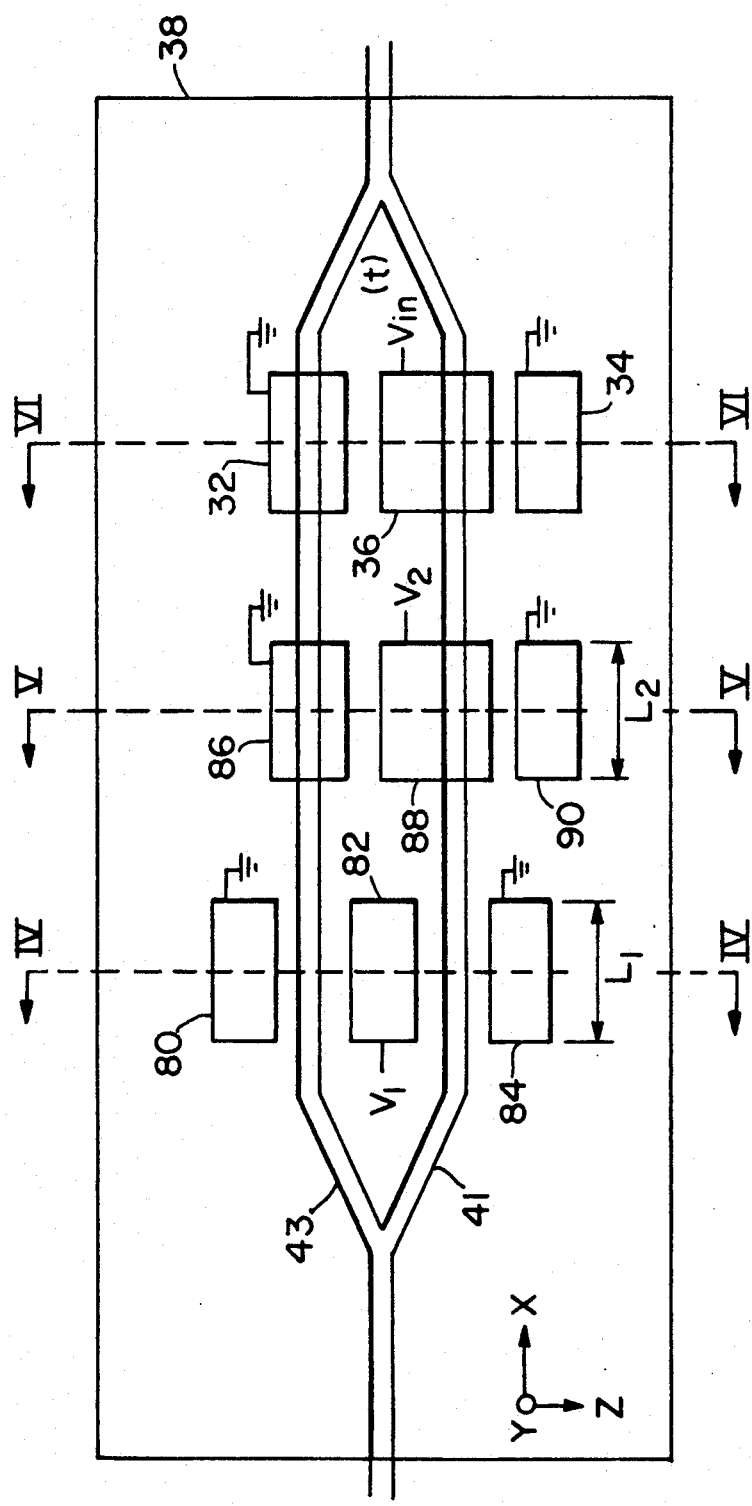

The modulating electrodes 32, 34 and 36 produce electric fields as shown in the cross-sectional view along section VI—VI depicted in FIG. 5d when a voltage is applied to electrode 36. These fields are used for intensity modulation so as to encode data into the carrier lightwave.

Figure 6A:
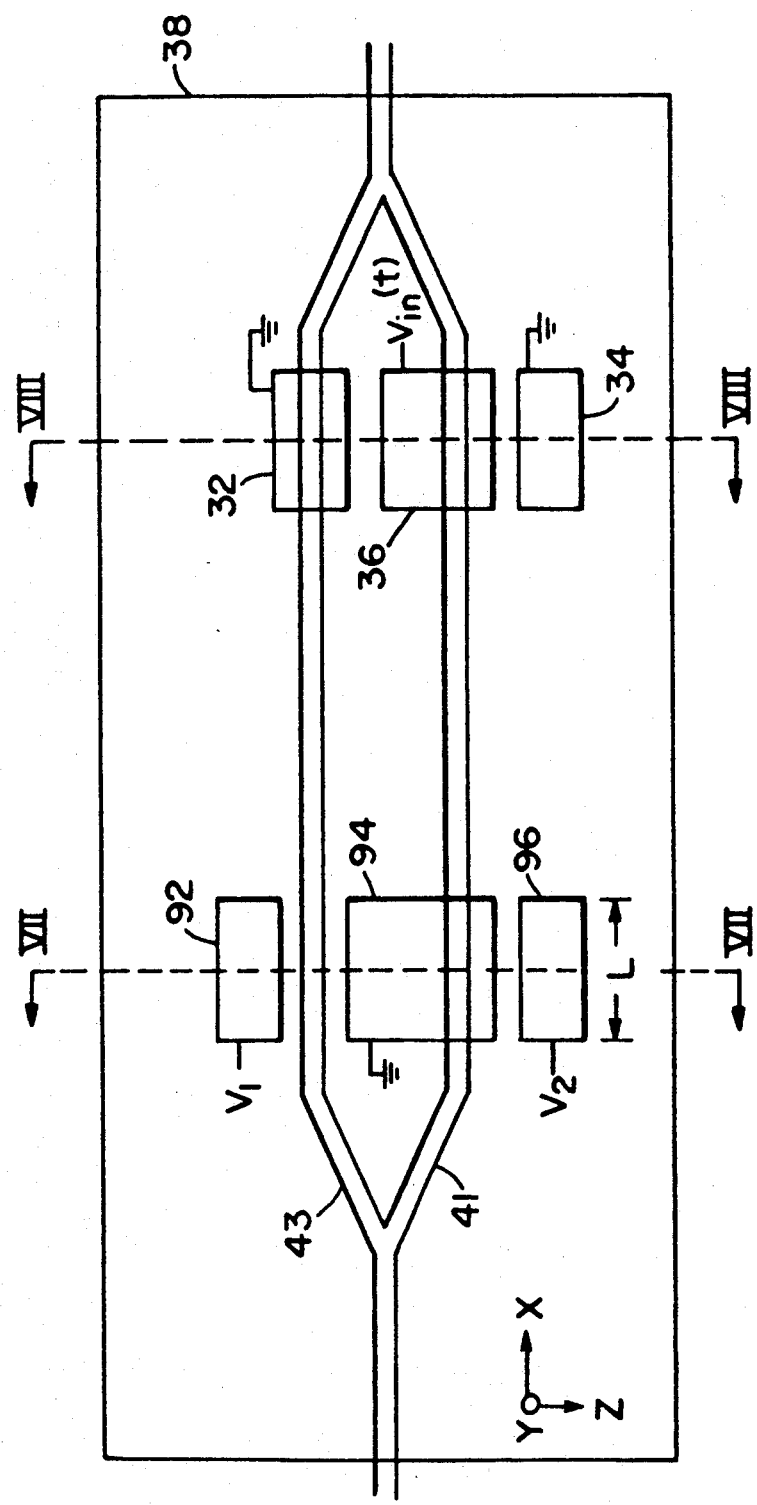
FIGS. 6a, 6b and 6c show an alternative electrode configuration for modulator phase bias adjustment when using a Z-cut lithium niobate substrate.
Figure 6B:
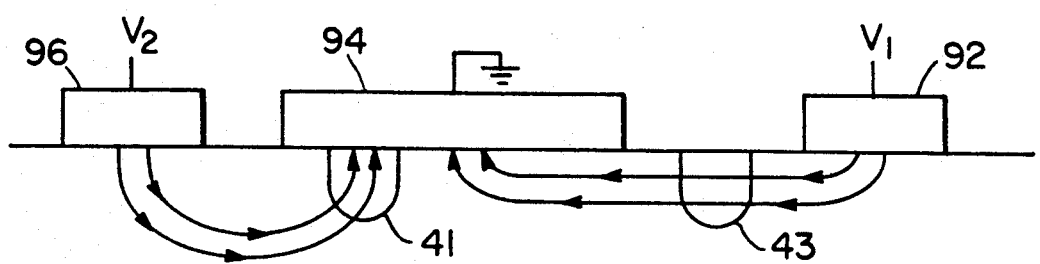

FIG. 6a shows an additional configuration that may be employed for independent phase bias control with a Z-cut lithium niobate substrate. In this configuration, only a single set of electrodes 92, 94 and 96 are used to adjust the phase biases. FIG. 6b shows a cross-sectional view along section VII—VII. It depicts the electric fields generated when voltages $V_1$ and $V_2$ are applied to electrodes 92 and 96, respectively, assuming that electrode 94 is grounded. The electric field at branch 41 is oriented perpendicular to the surface of the substrate in the Z direction. In branch 43, however, the electric field is oriented in a transverse or Y direction. The result of such a configuration on the phase biases is equivalent to the effect already discussed for the configuration of FIG. 5a except that $L_1$ and $L_2$ are replaced with L in the equations expressing proportionality.

Figure 6C:
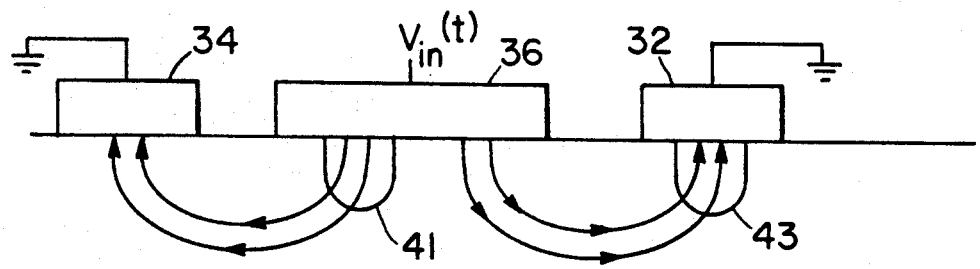

FIG. 6c shows a cross-sectional view along section VIII-VIII including the electric fields produced in the modulating electrodes 32, 34 and 36. As in all previous instances, the electrode configuration is used to modulate the intensity of the carrier light wave in response to an applied electrical signal $V_{in}(t)$.

The configurations shown are in large part particular to the respective Y-cuts and Z-cuts of lithium niobate. As mentioned previously alternate materials may be employed. Moreover, alternate electrode configurations may be employed, especially configurations involving more than two sets of phase bias electrodes. All these alternatives are intended to be embodied with the present invention.

To maximize the cancellation, the constant phase biases are set at:

$$\theta_{TM}=-{}^{90}/2 \; \theta_{TE}=\pi/2.$$

When the constant phase biases are set as such, the relationship of the dominant third-order intermodulation distortion components of the two polarization modes can be simplified to $$P_{in}{}^{TM}=\gamma^3 P_{in}{}^{TE}.$$

For a LiNbO$_3$ modulating means, $\gamma$ is typically approximately 3. Thus, the ratio of TM to TE power as established by polarizer 14 is set at 27 for third-order intermodulation distortion cancellation. The result of employing such a ratio of power levels is significant reduction of the dominant third-order intermodulation components with only the higher order component of distortion remaining. Results for $\gamma$ approximately equal to 3 are shown in FIG. 2.

FIG. 2 shows the effect of employing the dual polarization method encompassed by the present invention. In particular it shows a plot of the detector electrical output power level for the fundamental and third-order intermodulation product as a function of electrical drive power. The dashed lines indicate the single polarization results, and the solid lines indicate the optimized dual polarization results with $$\gamma=3, \; \theta_{TE}=\pi/2 \text{ and } \theta_{TM}=-\pi/2.$$

As FIG. 2 indicates a significant reduction in intermodulation distortion can be achieved for a given depth of modulation at the fundamental frequency. As the depth of modulation decreases, the reduction in intermodulation distortion increases. With this bias condition, even harmonics also vanish. Further, if the intermodulation suppression is specified, the fundamental output power from the detector can be substantially increased. As FIG. 2 reveals, a −9dB increase in the fundamental output power can be obtained with the present invention if a 65-dB intermodulation suppression level is specified.

Note that in practice the polarizer 14 and filters 16 and 16' could be replaced by a polarizing optical fiber. Also, it is not necessary to couple the light wave to the polarizer and modulator by a fiber. A focused light beam may be used instead.

The present invention significantly increases the dynamic range that may be achieved in electro-optical communication systems. It is especially useful in systems that have stringent intermodulation suppression requirements and that are not limited by either available power or by intermodulation distortion of the electrical driver.

Equivalents

While the invention has been particularly shown and described with reference to preferred embodiments thereof, it will be understood by those skilled in the art that various changes in form and details may be made without departing from the spirit and scope of the invention as defined in appended claims.

I claim:

1. A method for reducing intermodulation distortion caused by cubic modulator non-linearity in a modulation system comprising the steps of:
   (a) providing a carrier wave having an intensity and first and second polarization components;
   (b) adjusting the magnitude of the first polarization component relative to the magnitude of the second polarization component;
   (c) setting the modulator phase biases of the first polarization component and the second polarization component; and
   (d) modulating the intensity of the carrier wave with an electrical signal such that the cubic modulator non-linearity of the first polarization component cancels the cubic modulator non-linearity of the second polarization component, thereby reducing intermodulation distortion.

2. A method as recited in claim 1 wherein the modulator phase biases of the first polarization component and the second polarization component are set so that the components are out of phase with respect to each other.

3. A method as recited in claim 2 wherein the modulator phase biases of the polarization components are set $\pi$ radians out of phase with respect to each other.

4. A method as recited in claim 1 wherein the carrier wave is provided by a laser light source.

5. A method as recited in claim 1 wherein said adjusting the magnitude of the polarization components step comprises rotating a polarizer means from a first position to a second position.

6. A method as recited in claim 5 wherein the polarizer is a polarization-preserving optical fiber.

7. A method as recited in claim 1 wherein the step of setting the modulator phase biases comprises applying an electrical field to the modulator so as to change an index of refraction of a path through which the carrier wave travels.

8. A method of reducing intermodulation distortion caused by cubic modulator non-linearity in a modulating system having a light source for generating a carrier wave having an intensity, a polarizing means for polarizing the carrier wave, and a modulator for modulating intensity of the carrier wave with an electrical signal so as to encode information, said modulator including an electrode means for applying an electric field to the carrier wave, comprising the steps of:
   (a) producing the carrier wave using the light source;
   (b) polarizing the carrier wave with the polarizing means to adjust the relative optical power of the carrier wave in the transverse electric (TE) polarization mode of the modulator versus the optical power of the carrier wave in the transmagnetic (TM) polarization mode of the modulator to utilize the differing responses of the TE polarization mode components of the carrier wave and the TM polarization modes of the carrier wave;
   (c) adjusting relative modulator phase biases of the TM polarization mode components and the TE polarization mode components such that due to the relative phase biases and the optical power of the polarization modes components, a dominant cubic term of modulator non-linearity in the TE polarization mode is cancelled by a dominant cubic term of modulator non-linearity in the TM polarization mode, thereby reducing intermodulation distortion; and
   (d) modulating the intensity of the polarized carrier wave with an electrical signal.

9. A method as recited in claim 8 wherein the relative modulator phase biases of the polarization components are adjusted by applying an electric field to the modulator.

10. A method as recited in claim 8 wherein the electric field is applied by application of a voltage to a modulator electrode.

11. A method as recited in claim 8 wherein the phase biases of the polarization components are adjusted so that they are out of phase.

12. A method as recited in claim 11 wherein the phase biases are adjusted so that the polarization mode components of the carrier wave are $\pi$ radians out of phase with respect to each other.

13. A method of reducing intermodulation distortion caused by cubic modulator non-linearity in a modulating system having a light source for generating a carrier wave, a polarizer for polarizing the carrier wave, and a modulator for modulating intensity of the carrier wave, said modulator including at least one set of electrodes for adjusting modulator phase biases of polarization mode components of the carrier wave, comprising the step of:
   (a) producing the carrier wave from the light source;
   (b) polarizing the carrier with the polarizer to adjust the relative optical power of the carrier wave in the transverse electric (TE) polarization mode of the modulator versus the optical power of the carrier wave in transverse magnetic (TM) polarization mode of the modulator to utilize differing responses of the TE polarization mode and TM polarization mode to an electrical signal used for modulation of the carrier wave;
   (c) applying at least one voltage to the at least one set of electrodes to adjust the relative phase biases of the TE polarization mode components and the TM polarization mode components of the carrier wave such that as aided by the polarization of the carrier wave by the polarizer, a dominant cubic term of modulator non-linearity in the TE polarization mode is cancelled by a dominant cubic term of modulator non-linearity in the TM polarization mode after modulation, thereby reducing intermodulation distortion.

14. A method as recited in claim 13 wherein the applying of at least one voltage step comprises applying a first voltage to a first set of electrodes of the at least one set of electrodes and applying a second voltage to a second set of electrodes of the at least one set of electrodes.

15. A method as recited in claim 13 wherein the applying at least one voltage step comprises applying a single voltage to a set of electrodes of the at least one set of electrodes.

16. A method as recited in claim 13 wherein the applying at least one voltage step comprises applying a first voltage and applying a second voltage to a set of electrodes of the at least one set of electrodes.

17. An electro-optical modulating system having reduced third-order intermodulation distortion comprising:
   (a) a light source for producing a carrier wave;
   (b) a polarizer for polarizing the carrier wave to adjust power of the carrier wave in transverse electric (TE) polarization mode relative to power of the carrier wave in transverse magnetic (TM) polarization mode;
   (c) at least one set of electrodes for adjusting phase biases of TE and TM polarization mode components of the carrier wave; and
   (d) a modulating means for applying an electrical signal that modulates the carrier wave to encode information;
wherein adjustments to relative optical power of the carrier wave in the TE polarization mode versus optical power of the carrier wave in the TM polarization mode by the polarizer and phase bias adjustment to the TE and TM polarization mode components induced by the at least one set of electrodes result in offsetting of a dominant cubic term of intermodulation distortion.

18. An electro-optical modulating system as recited in claim 17 further comprising a interferometric modulator in which the carrier wave travels.

19. An electro-optical modulating system as rectied in claim 18 wherein the interferometric modulator is comprised of an electro-optic crystal.

20. An electro-optical modulating system as recited in claim 19 wherein the interferomatric modulator is comprised of lithium niobate.

21. An electro-optical modulating system as recited in claim 19 wherein the interferometric modulator is comprised of lithium tantalate.

22. An electro-optical modulating system as recited in claim 17 wherein the light source is a laser diode.

23. An electro-optical modulating system as recited in claim 17 wherein the modulating means comprises a set of electrodes for applying an electric field to the carrier wave.

24. An electro-optical modulating system as rectied in claim 17 wherein the at least one set of electrodes comprises a single set of electrodes.

25. An electro-optical modulating system as recited in claim 17 wherein the at least one set of electrodes comprises plural sets of electrodes.

26. An electro-optical modulating system having reduced third-order intermodulation distortion comprising:
   (a) an interferometric modulator comprised of plural branches for carrying a carrier wave;
   (b) a light source for producing the carrier wave;
   (c) a polarizer for polarizing the carrier wave to adjust power of the carrier wave in transverse electric (TE) polarization mode of the modulator relative to power of the carrier wave in transverse magnetic (TM) polarization mode of the modulator;
   (d) at least one set of modulator electrodes for adjusting phase biases of TE and TM polarization mode components of the carrier wave; and
   (e) a modulating means comprised of a set of electrodes for applying an electrical signal that modulates the carrier wave to encode information;
wherein adjustments to relative optical power of the carrier wave in the TE polarization mode versus optical power of the carrier wave in the TM polarization mode by the polarizer and adjustments to phase biases of the polarization mode components by the at least one set of electrodes result in offsetting of a dominant cubic term of intermodulation distortion.

27. An electro-optical modulating system as recited in claim 26 wherein the interferometric modulator is formed out of an electro-optic crystal.

28. An electro-optical modulating system as recited in claim 27 wherein the interferometric modulator is formed out of a III-V semiconductor material.

29. An electro-optical modulating system as recited in claim 27 wherein the interferometric modulator is formed out of lithium niobate.

30. An electro-optical modulating system as recited in claim 26 wherein the at least one set of electrodes comprises a single set of electrodes.

31. An electro-optical modulating system as recited in claim 30 wherein the single set of electrodes is comprised of two outer electrodes connected to separate voltage sources and an inner electrode connected to a ground.

32. An electro-optical modulating system as recited in claim 31 wherein the inner electrode is situated over a first branch of the interferometric modulator so that when a voltage is applied at the outer electrode nearest the first branch an electric field is generated in the first branch that is perpendicular to the plane of the interferometric modulator and when a voltage is applied to the other outer electrode an electric field is generated in the second branch that is transverse to the plane of the interferometric modulator.

33. An electro-optical modulating system as recited in claim 32 wherein the electrodes that comprise the modulating means are situated such that when a voltage is applied to a selected one of the electrodes electric fields are generated at the first and the second branches of the interferometric modulator that are transverse to the plane of the interferometric modulator.

34. An electro-optical modulating system as recited in claim 32 wherein the electrodes that comprise the modulating means are situated such that when a voltage is applied to a selected one of the electrodes electric fields are generated in both the first branch and the second branch of the interferometric modulator that are perpendicular to the plane of the interferometric modulator 35. An electro-optical modulating system as recited in claim 26 wherein the at least one set of electrodes for adjusting phase biases is comprised of two separate sets of electrodes.

36. An electro-optical modulating system as recited in claim 35 wherein a first set of the electrodes for adjusting phase biases is comprised of electrodes that generate electric fields transverse to the plane of the interferometric modulator when a voltage is applied to one electrode of the first set of electrodes, and a second set of the electrodes for adjusting phase biases is comprised of electrodes that generate electric fields perpendicular to the plane of the interferometric modulator when voltages are applied to selected electrodes of the second set of electrodes.

37. An electro-optical modulating system as recited in claim 36 wherein electrodes that comprise the modulating means generate electric fields perpendicular to the plane of the interferometric modulator when a voltage is applied to a selected electrode of the electrodes that comprise the modulating means.

38. An electro-optical modulating system as recited in claim 36 wherein electrodes that comprise the modulating means generate electric fields transverse to the plane of the interferometric modulator when a voltage is applied to a selected electrode of the electrodes that comprise the modulating means.

39. An electro-optical modulating system as recited in claim 26 wherein the interferometric modulator is comprised of Y-cut lithium niobate.

40. An electro-optical modulating system as recited in claim 26 wherein the interferometric modulator is comprised of Z-cut lithium niobate.

41. An electro-optical modulating system as recited in claim 26 wherein the interferometric modulator is comprised of Y-cut lithium tantalate.

42. An electro-optical modulating system as recited in claim 26 wherein the interferometric modulator is comprised of Z-cut lithium tantalate.

43. An electro-optical modulating system having reduced third-order intermodulation distortion comprising:
    (a) an interferometric modulator comprised of plural branches for carrying a carrier wave;
    (b) a light source for producing the carrier wave;
    (c) a polarizer for polarizing the carrier wave to adjust power of the carrier wave in transverse electric (TE) polarization mode of the modulator relative to power of the carrier wave in transverse magnetic (TM) polarization mode of the modulator;
    (d) at least one set of modulator electrodes for adjusting phase biases to TE and TM polarization mode components of the carrier wave;
    (e) a modulating means comprised of a set of electrodes for applying an electrical signal that modulates the carrier wave to encode information such that:

$$P_{in}^{TE}(\phi_m^{TE})^3 \sin\theta_{TE} = P_{in}^{TM} (\phi_m^{TM})^3 \sin\theta_{TM}$$

where
$P_{in}^{TE}$ = input optical power in the TE polarization mode;
$P_{in}^{TM}$ = input optical power in the TM polarization mode;
$\phi_m^{TE}$ = time-varying phase modulation in the TE polarization mode;
$\phi_m^{TM}$ = time-varying phase modulation in the TM polarization mode;
$\theta_{TE}$ = phase bias for the TE polarization mode;
$\theta_{TM}$ = phase bias for the TM polarization mode.

* * * * *

UNITED STATES PATENT AND TRADEMARK OFFICE
CERTIFICATE OF CORRECTION

PATENT NO. : 5,015,053
DATED : May 14, 1991
INVENTOR(S) : Leonard M. Johnson

It is certified that error appears in the above-identified patent and that said Letters Patent is hereby corrected as shown below:

Col. 11, line 51, delete "rectied" and insert ---recited---.

Col. 13, line 40, delete "rectied" and insert ---recited---.

Col. 13, line 55, delete "rectied" and insert ---recited---.

Signed and Sealed this

Third Day of November, 1992

Attest:

DOUGLAS B. COMER

Attesting Officer     Acting Commissioner of Patents and Trademarks